3,442,844
TERPOLYMER LATEX AND PROCESS
Robert Thomas Bouchard, Gardner, Jack Dickstein, Leominster, and Donald Eugene Dean, Fitchburg, Mass., assignors to The Borden Company, New York, N.Y., a corporation of New Jersey
No Drawing. Filed Feb. 10, 1966, Ser. No. 526,381
Int. Cl. C08f 15/40; C09d 5/02
U.S. Cl. 260—29.6                    10 Claims

ABSTRACT OF THE DISCLOSURE

This invention pertains to a process for making layered terpolymers, to the terpolymers made thereby and to latex paints incorporating said terpolymers. The scrub resistance of latex paints is greatly enhanced by incorporating terpolymers therein. The terpolymers are prepared by forming layers of vinyl acetate, a dialkyl ester of a dicarboxylic acid and an acrylate ester, the outer layer having a percentage of acrylate ester, based on the monomers in said layer, far greater than that of the inner layer.

---

This invention relates to layered terpolymers of vinyl acetate. More particularly, the invention relates to layered terpolymers of vinyl acetate which impart improved scrub resistance to latex base paints and will be described in connection therewith.

Latex paints have been prepared from layered terpolymers wherein each layer has approximately the same proportion of monomers therein. These latex paints, although satisfactory for most purposes, suffer from a limitation of having reduced scrub resistance. Such scrub resistance tests are hereinafter described in connection with this invention.

Briefly stated, the instant invention provides a latex base paint having superior scrub resistance at room and reduced temperatures.

The present invention comprises a unique polymerization method for preparing the terpolymer, said terpolymer, and latex base paints made with said terpolymer wherein vinyl acetate comprises the major monomer proportion of the terpolymer.

The terpolymer is found to have the superior scrub resistance properties when made as a layered particle having the outer layer enriched in acrylate ester content. The ester provides additional softness in the outer layer and the desired hardness in the inner or core layer of the particle. The advantageous results achieved by a layered particle of this type are shown in the table.

As to materials, the terpolymer includes vinyl acetate in major proportions for which we know of no substitute.

The comonomers with vinyl acetate are dialkyl esters of alpha-beta unsaturated dicarboxylic acids, as for example, $C_1$–$C_{10}$ dialkyl substituted $C_4$–$C_{10}$ alpha-beta unsaturated dicarboxylic acids. The alpha-beta unsaturation is a polymerizable ethenoid double bond. The other comonomer with vinyl acetate are $C_1$–$C_{10}$ alkyl ester of an acrylic or methacrylic acid.

Specific examples of the dialkyl moiety of the esters of the dicarboxylic acids include dimethyl, diethyl, dibutyl, dihexyl, dioctyl, didecyl and combinations thereof, as for example, ethyl-octyl. The dicarboxylic acid component of the diester is typified as maleic, fumaric, itaconic, citraconic, mesaconic, glutaconic, and the like acids. Preferred are the dialkyl maleates and especially dioctyl maleate because of its integral plasticizing ability in the terpolymer. It is understood that this preferred monomeric component may be mixed dialkyl esters of said dicarboxylic acid.

Examples of the alkyl acrylates include methyl, isopropyl, 2-ethylhexyl, butyl and octyl esters of acrylic and methacrylic acid.

Other materials which can be added as desired and as known in the polymerization art are, for example, thickeners, emulsifiers, defoamers, water, catalysts, etc. The preferred catalyst of ethenoid bond polymerization is the peroxy type catalyst, as for example, potassium persulfate, azo-bis-isobutyronitrile, hydrogen peroxide, benzoyl peroxide, bis-2-4-dichlorobenzoyl chloride, di-1-naphthoyl peroxide, and t-butyl hydro-peroxide, alone or in combination.

Examples of the other additives include hydroxy ethylcellulose as a thickener, ethoxylated sodium lauryl sulfate as emulsifier, mixed hydrocarbons containing less than 1% silicone as a defoamer, and other materials useful for associated purposes.

In the process of this invention the monomeric components are prepared in separate mixtures as briefly described. Into the first portion (portion I) is mixed approximately ½ of the total vinyl acetate, approximately ½ of the total dialkyl ester of dicarboxylic acid, and approximately ⅓ of the total acrylate ester. The second portion (portion II) is a mixture of the remaining monomers.

Between about 1–50% of the total monomer weight is added to the reaction vessel from portion I together with catalyst in the first addition step. Other additives can also be included therein. After polymerization of this portion, the remaining part of portion I is added to the reaction vessel followed by the total of portion II together with the remainder of the catalyst. Polymerization proceeds until the vapor pressure substantially drops and maintains a constant level thereby indicating substantially complete polymerization.

As to proportions, the following tables set forth the illustrated and recommended ranges of proportions. It is to be understood that the illustrated range is typical of the proportions of the invention and the recommended range is within the optimum or preferred range of proportions.

TABLE I

| Ingredients | Parts per 100 parts of total monomer | |
|---|---|---|
| | Recommended | Illustrative |
| Vinyl acetate | 50–80 | 50–90 |
| Dialkyl ester | 8–35 | 5–45 |
| Alkyl acrylic ester | 5–15 | 3–20 |
| Catalyst | .3–1.5 | .1–2 |

TABLE II

| Monomer ingredients | Parts per 100 parts of each monomer ingredient | | | |
|---|---|---|---|---|
| | Portion I | | Portion II | |
| | Recomm. | Illustr. | Recomm. | Illustr. |
| Vinyl acetate | 25–55 | .5–70 | 75–45 | 99.5–30 |
| Dialkyl ester | 25–55 | .05–70 | 75–45 | 99.95–30 |
| Alkyl acrylic ester | 5–20 | .05–40 | 95–80 | 99.95–60 |

TABLE III

| | Percent by weight | | | |
|---|---|---|---|---|
| | Portion I | | Portion II | |
| | Recomm. | Illustr. | Recomm. | Illustr. |
| Total monomers | 5–40 | 1–50 | 95–60 | 99–50 |

Example I

Into 38 grams of water at room temperature containing hydroxy-ethyl cellulose (.5 grams, thickener), ethoxylated sodium lauryl sulfate (2.5 grams, emulsifier), and mixed hydrocarbons containing less than 1% silicone (.003 gram, defoamer) was added 5.4 grams of monomers from portion I, in the proportions shown. The monomers were prepared in two portions in the gram quantities shown:

|  | Portion I (grams) | Portion II (grams) |
| --- | --- | --- |
| Vinyl acetate | 20.5 | 20.5 |
| Dioctyl maleate | 3.5 | 3.5 |
| 2-Ethyl hexyl acrylate | 1.8 | 3.7 |
|  | 25.8 | 27.7 |

The total monomer weight was 53.5 grams of which 10% was approximately 5.4 grams.

Potassium persulfate (.12 gram, catalyst) in a water solution was added to the monomer vessel and the system heated to reflux. When the batch reached 82° C., the remainder of portion I was slowly added, followed by portion II. The total time for adding the remainder of portion I and portion II was about 3 hours. Additional catalyst (.13 gram), was also added. At the end of the last addition period, the batch was heated to about 92–93° C. and held for about 30 minutes until the reflux subsided. The unreacted monomers were removed by vapor stripping at 90–92° C. for an additional 15 minutes prior to cooling. Additional catalyst may optionally be added to the batch during the stripping step to aid in eliminating free monomer. The latex was about 55% solids.

Example II

The procedure of Example I is repeated except that the dioctyl maleate is replaced separately and in turn by the dialkyl esters of alpha-beta unsaturated dicarboxylic acids and in proportions herein disclosed.

Example III

The procedure of Example I is repeated except that the 2-ethyl hexyl acrylate is replaced separately and in turn by the alkyl esters of acrylic and methacrylic acid and in proportions herein disclosed.

Example IV

The procedure of Example I is repeated except that the proportions of the portions shown in that example are changed as follows:

|  | Portion I (grams) | Portion II (grams) |
| --- | --- | --- |
| Vinyl acetate | 19 | 26 |
| Diotyl maleate | 7 | 6 |
| 2-Hexyethyl acrylate | 4 | 6 |
|  | 30 | 38 | and the first addition of portion I is 20% of the total monomer weight, namely, 13.6 grams. The other materials are adjusted in proportion to the monomers used.

Example V

The procedure of Example I was repeated except that all the monomers were mixed together and addition was made as described, namely, 10% of the mixed monomers were added initially, followed by the remaining 90% over a 3-hour period. This Example is not part of the instant invention, but is used to contrast the improved properties of the products made with the process of this invention.

Example VI

The polymers of Examples I and V were made into a latex paint by blending 145 grams of each of said latices with 1008 grams respectively of an interior flat paint base using standard manufacturing techniques.

The latex base paints were drawn down as a film on an adhering surface such as plaster board. A Gardner scrub machine was used to repeatedly scrub the dried surface. The number of scrubs required to obtain film failure was noted at a particular temperature.

TABLE IV

| Temperature, ° F. | Average number of scrubs to failure | | Percent increase |
| --- | --- | --- | --- |
|  | Example I | Example V |  |
| 70 | 199 | 162 | 20 |
| 40 | 241 | 193 | 25 |

The higher number of scrubs required confirms the tougher paint product made.

It will be understood that it is intended to cover all changes and modifications of the examples of the invention herein chosen for the purpose of illustration which do not constitute departures from the spirit and scope of the invention.

We claim:
1. A process for making layered terpolymers which comprises:
   (1) forming two separate monomeric mixture portions each consisting essentially of a vinyl acetate, a dialkyl ester of an alpha-beta unsaturated dicarboxylic acid, and an alkyl acrylic ester;
   (2) admixing into aqueous medium:
      (a) from about 1% to about 50% by weight of total monomers taken from a first portion of monomers, said total monomers consisting essentially of, in weight proportion for 100 parts of total monomers in said first portion; vinyl acetate in proportion of between 50–90 parts; dialkyl ester of alpha-beta unsaturated dicarboxylic acid in proportion of between 5–45 parts; and, alkyl acrylic ester in proportion of between 3–20 parts; said first portion being a mixture of said vinyl acetate in weight proportion of between .5–70% of the total proportion of said vinyl acetate in both portions; said dialkyl ester of alpha-beta unsaturated dicarboxylic acid in weight proportion of between .05–70% of the total proportion of said dialkyl ester in both portions; and, said alkyl acrylic ester in weight proportion of between .05–40% of the total proportion of said alkylacrylic ester in both portions; and,
      (b) catalyst of polymerization;
   (3) heating said admixture to reflux;
   (4) slowly admixing into said admixture, the balance of said first portion together with catalyst of polymerization;
   (5) slowly admixing the second portion of monomers, together with catalyst of polymerization, said second portion being a mixture of remaining monomers and said alkyl acrylic ester being present in a proportion, based on total monomers present in said first and second portions, greater than in said first portion; and,
   (6) heating said total monomers admixture at reflux.
2. The process of claim 1, wherein the weight proportion of said first portion is between 5–40% of said total monomers.
3. The process of claim 1, wherein said dialkyl ester is selected from the group consisting of $C_1$–$C_{10}$ dialkyl substituted $C_4$–$C_{10}$ alpha-beta unsaturated dicarboxylic acids.
4. The process of claim 1, wherein said alkyl acrylic ester is selected from the group consisting of $C_1$–$C_{10}$ alkyl esters of acrylic and methacrylic acid.
5. The process of claim 2, wherein said dialkyl ester is dioctyl maleate and said alkyl acrylic ester is 2-ethyl hexyl acrylate.
6. The process of claim 5, wherein said first portion being a mixture of: said vinyl acetate in weight proportion of between 25–55% of the total proportion of said vinyl acetate; said dioctyl maleate in weight proportion of between 25–55% of the total proportion of said dioctyl maleate; and, said 2-ethyl hexyl acrylate in weight proportion of between 5–20% of the total proportion of said 2-ethyl hexyl acrylate.

7. The terpolymer made as in the process of claim 1.
8. The terpolymer made as in the process of claim 6.
9. A water based latex paint including the terpolymer made as in the process of claim 1.
10. A water based latex paint including the terpolymer made as in the process of claim 6.

References Cited

UNITED STATES PATENTS

| | | | |
|---|---|---|---|
| 3,275,589 | 9/1966 | Alexander et al. | |
| 2,570,253 | 10/1951 | Lungquist | 260—29.6 |
| 2,795,564 | 6/1957 | Conn et al. | 260—29.6 |
| 3,070,561 | 12/1962 | Hager et al. | 260—29.6 |
| 3,231,534 | 1/1966 | Blades et al. | 260—29.6 |

SAMUEL H. BLECH, *Primary Examiner.*

H. ROBERTS, *Assistant Examiner.*

U.S. Cl. X.R.

260—78.5, 885